POWER SAVING STORAGE CIRCUIT EMPLOYING CONTROLLABLE POWER SOURCE

Filed Sept. 20, 1963 2 Sheets-Sheet 1

Fig. I

INVENTOR.
JOHN T. WINKLER
BY
Michael A. Sileo Jr.
ATTORNEY

Dec. 28, 1965 J. T. WINKLER 3,226,574

POWER SAVING STORAGE CIRCUIT EMPLOYING CONTROLLABLE POWER SOURCE

Filed Sept. 20, 1963 2 Sheets-Sheet 2

INVENTOR.
JOHN T. WINKLER
BY
Michael A. Sike, Jr.
ATTORNEY

United States Patent Office 3,226,574

Patented Dec. 28, 1965

3,226,574
POWER SAVING STORAGE CIRCUIT EMPLOYING CONTROLLABLE POWER SOURCE

John T. Winkler, Orlando, Fla., assignor to Martin-Marietta Corporation, Middle River, Md., a corporation of Maryland Filed Sept. 20, 1963, Ser. No. 310,253
15 Claims. (Cl. 307—88.5)

This invention relates to an electronic storage circuit having a dual current mode characteristic for providing relatively low power consumption during predetermined periods of operation and more particularly to a relatively high speed bistable transistor storage circuit which can be operated in a high current mode sufficient to sustain the circuit during operating intervals and can be rapidly switched to and maintained in a low current mode sufficient to sustain the circuit during storage intervals.

Since the end of World War II, considerable research and development has been expended in the art of micro-miniaturization of electronic circuits particularly for use in man-portable electronic systems and satellite applications where size and weight are critical factors. In electronic systems of this type many data storage circuits are utilized. Such storage circuits are generally operated at relatively high speeds for relatively short intervals and require considerable power during the operation intervals. However, the power requirements need not be high during the time between operating intervals; i.e. the storage intervals. That is to say, it is commonly known that the power requirements during high speed operating intervals is considerably greater than the power requirements during storage intervals. Since the storage intervals are generally long relative to the operating intervals, it is highly desirable, from a power economy viewpoint, that storage circuits of this type operate in a low power consumption state during the storage intervals.

Many attempts have been made to minimize the power consumed by high speed storage circuits during storage intervals. One known technique utilizes a secondary storage circuit, such as low energy flip-flops or magnetic cores, wherein the data to be stored is shifted to this secondary storage circuit and the primary storage circuit is de-energized during the storage intervals. This technique is generally not acceptable where space and weight are critical factors, as they are in micro-miniaturization of electronic circuits, since it necessitates the inclusion of additional circuitry and electronic components, particularly storage elements and precision timing and sequencing apparatus. Another known technique increases the battery source capacity so that the storage circuit can be sustained in a high current mode even during storage intervals. This technique due to increased battery size requirements is also not acceptable in modern high speed electronic systems where space and weight are at a premium. In general, the problem resolves itself to a technique for effectively removing all components from the storage circuit which are not needed during the storage intervals and maintain in the circuit only those components which have low power consumption requirements yet maintain storage capability.

The present invention uniquely utilizes bistable transistor flip-flops as storage elements which may be used, for example, in a decade or ring counter circuit arrangement, wherein switching means are provided for placing each bistable flip-flop in a high current mode during high speed operating intervals and in a low current mode during storage intervals. This highly desirable dual current mode characteristic is achieved by a switching technique in the collector circuit of each bistable transistor flip-flop in conjunction with the absence of the generally required bias on the base electrodes of each flip-flop transistor. In general, the switching technique electronically inserts during storage intervals additional resistance into the collector-emitter current path of each transistor of each bistable flip-flop thereby considerably reducing current flow through the conducting transistor of each flip-flop and placing the flip-flop in a low current mode yet retaining their inherent storage characteristics. The switching technique also electronically removes during operating intervals the additional resistance in the collector-emitter current path of each transistor of each bistable flip-flop and consequently increases the current flow through the conducting transistor of each flip-flop and returns the flip-flop to their high current mode thereby providing the required current for performing the desired high current logic functions. Any well known switching elements, such as transistors or diodes, may be incorporated to provide the required switching function and a simple switch, such as a transistor, may be utilized to control the switching elements.

It will be apparent, therefore, that the foregoing ideal characteristics are uniquely achieved by the present invention without increasing battery storage capacity or shifting the data into a secondary low power storage circuit. Accordingly, highly desirable power economy is achieved by the switching technique of the present invention without any significant increase in the size and weight of the storage circuit.

It is accordingly a primary object of the present invention to provide a simple and economical technique for sustaining a storage circuit in a low current mode during storage intervals yet providing a capability for switching the storage circuit into a high current mode during high speed operating intervals.

Another object of the present invention is to provide a bistable transistor storage circuit which can be operated in a high current mode sufficient to sustain the circuit during high speed operating intervals and rapidly switched to and maintained in a low current mode sufficient to sustain the circuit during storage intervals.

Another object of the present invention is to provide an electronic storage circuit having a dual current mode characteristic for providing relatively low power consumption during storage periods without increasing battery storage capacity or shifting the data to be stored into a secondary low power storage circuit.

Another object of the present invention is to provide an electronic storage circuit of the type described which is relatively light, has minimum space requirements, is economical to manufacture, is simple in operation and highly reliable in performing the intended functions and achieving the desired objects.

These and further objects and advantages of the present invention will become apparent upon reference to the following description and claims and the appended drawing, wherein:

Although the storage elements of the exemplary embodiment depicted in the accompanying drawings are bistable transistor flip-flops, it is to be understood that any other well known active storage elements may be substituted therefor without departing from the spirit and scope of the present invention. Further, it will be apparent to those skilled in the electronic and computer arts that the unique dual current mode storage device of the present invention may be advantageously incorporated into any well known storage and computer system without departing from the spirit and scope of the present invention and that the specific interconnection and coupling techniques necessary to utilize a plurality of such dual current mode storage devices in storage or computer environments merely requires design considerations readily available to those skilled in the prior art.

Figure 1:
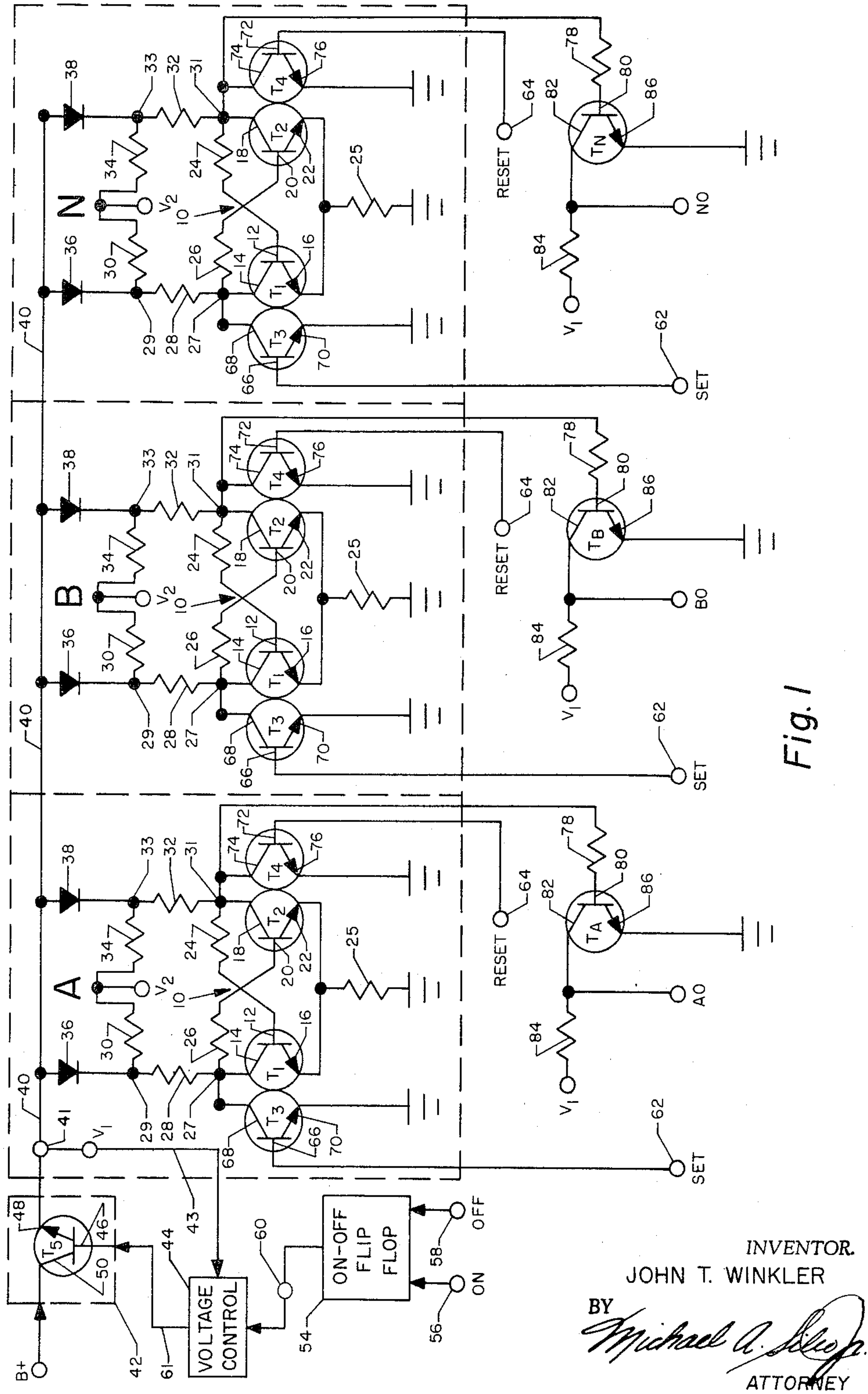
FIGURE 1 depicts an exemplary circuit of the present invention comprising a plurality of bistable transistor flip-flops each connected in independent storage circuit arrangement, and switching diodes for predeterminedly placing the dual current mode storage circuit in one of its current modes.

*Detailed description—FIGURE 1*

FIGURE 1 sets forth a plurality of independently operating storage circuits, generally indicated at A, B . . . N, to merely show the simplicity of incorporating the unique dual current mode storage circuit of the present invention into an electronic system having a plurality of bistable storage elements, such as, the transistor flip-flop in each of the storage circuits A, B . . . N. Although many well known techniques for interconnecting bistable storage circuits or for utilizing the intelligence stored in the circuits are contemplated, a simple transistor output circuit is shown for developing a voltage indicative of a state of operation of only one of the transistors in the bistable storage circuit. Further, although many techniques well known to those skilled in the computer art may be utilized for inserting digital information into the storage circuits, the exemplary embodiment described hereinafter merely sets forth common transistor SET and RESET input circuits.

Since each of the storage circuits A, B . . . N are similar in all respects, only a detailed description of storage circuit A will be hereinafter set forth, and for purposes of clarity and understanding the reference numerals used in storage circuit A will be correspondingly used in the remaining storage circuits.

Referring now to the storage circuit A, a conventional bistable transistor flip-flop, generally indicated at 10, is provided for storing digital information. The flip-flop 10 comprises transistors $T_1$ and $T_2$, each of which have base, collector and emitter electrodes, 12–14–16 and 18–20–22, respectively. The base electrode 12 of transistor $T_1$ is connected to the collector 18 of transistor $T_2$ via resistor 24; whereas, the base electrode 20 of transistor $T_2$ is connected to collector electrode 14 via resistor 26. The collector electrode 14 of transistor $T_1$ is connected to a source of potential $V_2$ via junction terminal 27, resistor 28, junction terminal 29 and resistor 30; whereas collector 18 of transistor $T_2$ is connected to source $V_2$ via junction terminal 31, resistor 32, junction terminal 33 and resistor 34. The emitter electrodes 16 and 22 of transistor $T_1$ and $T_2$, respectively are each connected to ground via resistor 25.

It should be noted at this point that the circuit elements described above set forth a conventional bistable transistor flip-flop circuit, and that the resistors in the collector circuits of both transistors $T_1$ and $T_2$ will control the amount of current flow through the emitter-collector current paths of these transistors. Thus, by appropriate selection of the resistive values of resistors 28–30 and 32–34 in the collector circuits of transistors $T_1$ and $T_2$, respectively, the flip-flop 10 may be designed to conduct in two current modes one a relatively low current mode for storage purposes and the other a relatively high current mode for operating at high speeds. The current mode of the transistors depends upon the specific circuit elements utilized.

Connected in the emitter-collector current path of transistor $T_1$ and $T_2$ are diodes 36 and 38; respectively, each of which have an anode and cathode. Diodes 36 and 38 may be conventional diodes wherein current will flow when the diodes are forward biased; i.e. a positive potential on the anode with respect to the cathode. Current will not flow through the diodes when they are backward biased; i.e. the anode biased negative with respect to the cathode. The cathodes at diodes 36 and 38 are respectively connected to the junction of resistors 28–30 and 32–34; i.e. junction terminals 29 and 33, and have their anodes connected to conductor 40. The conductor 40 is connected to terminal 41 which in turn is connected to the B+ source of potential through electronic switch 42. Electronic switch 42 may be any well known switching element that can be opened and closed electronically, and may be a transistor, diode or the like.

It should be noted at this point that the electronic switch 42 may be the power transistor of the voltage control circuit 44. This is a preferable technique since a regulated voltage $V_1$ is necessary for optimum perfomance of storage circuits A, B . . . N during operating periods and for biasing the output transistors $T_A$, $T_B$ . . . $T_N$. It will be apparent, therefore, that transistor $T_5$ may be either a separate transistor, as shown in FIG. 1 or the power transistor of a conventional voltage regulator or voltage control circuit.

In order to regulate the voltage present on conductor 40 and voltage terminal $V_1$, a feedback is provided to voltage control 44 via conductor 43 which is connected between terminal $V_1$ and voltage control 44. Any well known voltage control circuit or voltage regulator may be utilized without departing from the spirit and scope of the present invention.

Transistor $T_5$ of electronic switch 42 comprises a base 46, emitter 48 and collector 50. The collector 50 of transistor $T_5$ is directly connected to the potential source B+ whereas the base 46 is directly connected to the voltage control 44 which is directly connected to an ON-OFF electronic switch, such as the bistable flip-flop 54. The emitter 48 of transistor $T_5$ is directly connected to the terminal 41.

The ON-OFF flip-flop 54 has two input terminals 56 and 58 and one output terminal 60 and is designed so that a potential positive with respect to $V_1$ will appear at output terminal 60 when a TURN ON signal is applied to the ON terminal 56, and a potential approaching zero will appear at output terminal 60 when a TURN OFF signal is applied to the OFF terminal 58. The ON-OFF flip-flop 54 is coupled to the voltage control 44 via output terminal 60, while the voltage control 44 is connected to the base 46 of transistor $T_5$ via conductor 61. Accordingly, when a TURN ON signal is applied to the ON terminal 56 a positive regulated voltage is developed by voltage control 44 and coupled to the base 46 of transistor $T_5$ which biases transistor $T_5$ into a conducting state thereby coupling a voltage to conductor 40 and consequently to the anodes of diodes 36 and 38 thereby forward biasing the diodes. It will be apparent, that since a regulated voltage is coupled to the base 46 of transistor $T_5$, a regulated voltage will be present on conductor 40 by virtue of the feedback action from terminal 41 to base 46 via voltage control 44. Accordingly, source B+ may conventionally be an unregulated voltage supply.

When the anodes of diodes 36 and 38 are forward biased so as to be in a conducting state, a low resistance path for emitter-collector current flow from the transistors $T_1$ and $T_2$ is provided. The low resistance current path for transistor $T_1$ is as follows: ground, resistor 25, emitter 16 and collector 14 of transistor $T_1$, junction terminal 27, resistor 28, junction terminal 29, diodes 36, conductor 40, terminal 41, emitter 48 and collector 50 of transistor switch $T_5$, source B+, and back to ground. The low resistance current path for transistor $T_2$ is as follows: ground, resistor 25, emitter 22 and collector 18 of transistor $T_2$ junction terminal 31, resistor 32, junction terminal 33, diode 38, conductor 40, terminal 41, emitter 48 and collector 50 of transistor switch $T_5$, source B+ and back to ground.

It will be recalled that when the diodes 36 and 38 were backward biased, the emitter-collector current flow was to the source potential $V_2$. The high resistance current path for transistor $T_1$ is as follows: ground, resistor 25, emitter 16 and collector 14 of transistor $T_1$, junction terminal 27, resistor 28, junction terminal 29, resistor 30, source $V_2$, and back to ground. The high resistance current path for transistor $T_2$ is as follows: ground, resistor 25, emitter 22 and collector 18 of transistor $T_2$, junction terminal 31, resistor 32, junction terminal 33, resistor 34, source $V_2$, and back to ground. It will be further recalled that by appropriately selecting the resistance values of resistors 30 and 34 with regard to resistors 28 and 32, respectively, the current flow through the high resistance current paths will be relatively low and although insufficient for the flip-flop 10 of storage circuit A to operate at high speeds, it is sufficient to sustain the circuit during storage periods. This latter condition of the flip-flop 10 will be hereinafter referred to as the low current mode of the storage circuit A, whereas the former condition of the flip-flop 10 will be referred to as the high current mode of the storage circuit A.

When the diodes 36 and 38 are forward biased and in a conducting state as a result of the combined circuit opertaion of ON-OFF flip-flop 54 and electronic switch 42, current flow through the flip-flop 10 will be predominantly through the low resistance paths, i.e. diodes 36 and 38, to source B+, and relatively little current will flow through the high resistance paths, i.e., resistors 30 and 34 to the source $V_2$. This is so because the value of resistors 30 and 34 are high relative to resistors 28 and 32.

As mentioned previously, it is mightly desirable that the flip-flop 10 be selectively capable of functioning in a high current mode during normal operation so that it may function at high speeds or under high load conditions and functioning in a low current mode during storage operation. That latter condition provides a means of maintaining the last state under a considerably reduced power consumption for the over-all circuit.

Without taking into consideration the input or output circuits of the storage circuits, it will be apparent that when the ON-OFF flip-flop 54 receives an ON signal at terminal 56, the storage circuit A will be driven into a high current mode by virtue of a low resistance path, being inserted via diodes 36 and 38 in the emitter-collector circuit of the transistors $T_1$ and $T_2$.

Without taking into consideration the unique switching of the storage circuits from a low current mode to a high current mode, the input signals to the flip-flop 10 are applied at terminals 62 and 64, which are typically SET and RESET input terminals. The SET terminal 62 is directly connected to base 66 of transistor $T_3$. The collector 68 of input transistor $T_3$ is directly connected to the collector 14 of flip-flop transistor $T_1$. The RESET terminal 64 is directly connected to the base electrode 72 of input transistor $T_4$. The collector 74 of input transistor $T_4$ is directly connected to collector 18 of flip-flop transistor $T_2$. The emitter electrodes 70 and 76 of input transistors $T_3$ and $T_4$, respectively, are directly connected to ground. Thus, during high speed operation, flip-flop 10 may be operated by applying input signals to the SET and RESET terminals. It will be apparent therefore, that the storage circuit A may be operated at high speeds or under high loads by applying a SET or RESET signal to the terminals 62 and 64, respectively.

Again, without considering the unique switching of storage circuit A from a low current mode to a high current mode, the output signals of the storage circuit A are taken from the collector electrode 18 of transistor $T_2$ through an isolation resistor 78 and coupled to the base 80 of output transistor $T_A$. The collector 82 of output transistor $T_A$ is directly connected to the source of potential $V_1$ via load resistor 84. The output of storage circuit A is taken from the collector side of resistor 84 as indicated at $A_0$. It will be apparent that since the high current mode of the storage circuit A consumes considerable power when operated in a high speed mode, it is highly desirable that the circuit be switched to its low current mode during storage intervals.

To start a storage interval, a signal is applied to the OFF terminal 58 of ON-OFF flip-flop 54 thereby changing the voltage at base 46 of switching transistor $T_5$ and placing transistor $T_5$ in a non-conducting state and thus, opening the electronic switch 42 and disconnecting source $V_1$ from the anodes of diodes 36 and 38. When this takes place, diodes 36 and 38 are rendered non-conductive and cause resistors 30 and 34 to be the main collector loads for transistors $T_1$ and $T_2$. It will be apparent, therefore, that application of ON and OFF signals to the ON-OFF flip-flop 54 advantageously enables predetermined switching of the storage circuit A to its high current mode during operating intervals and to its low current mode during intervals between operating intervals, i.e., storage intervals.

Figure 2:
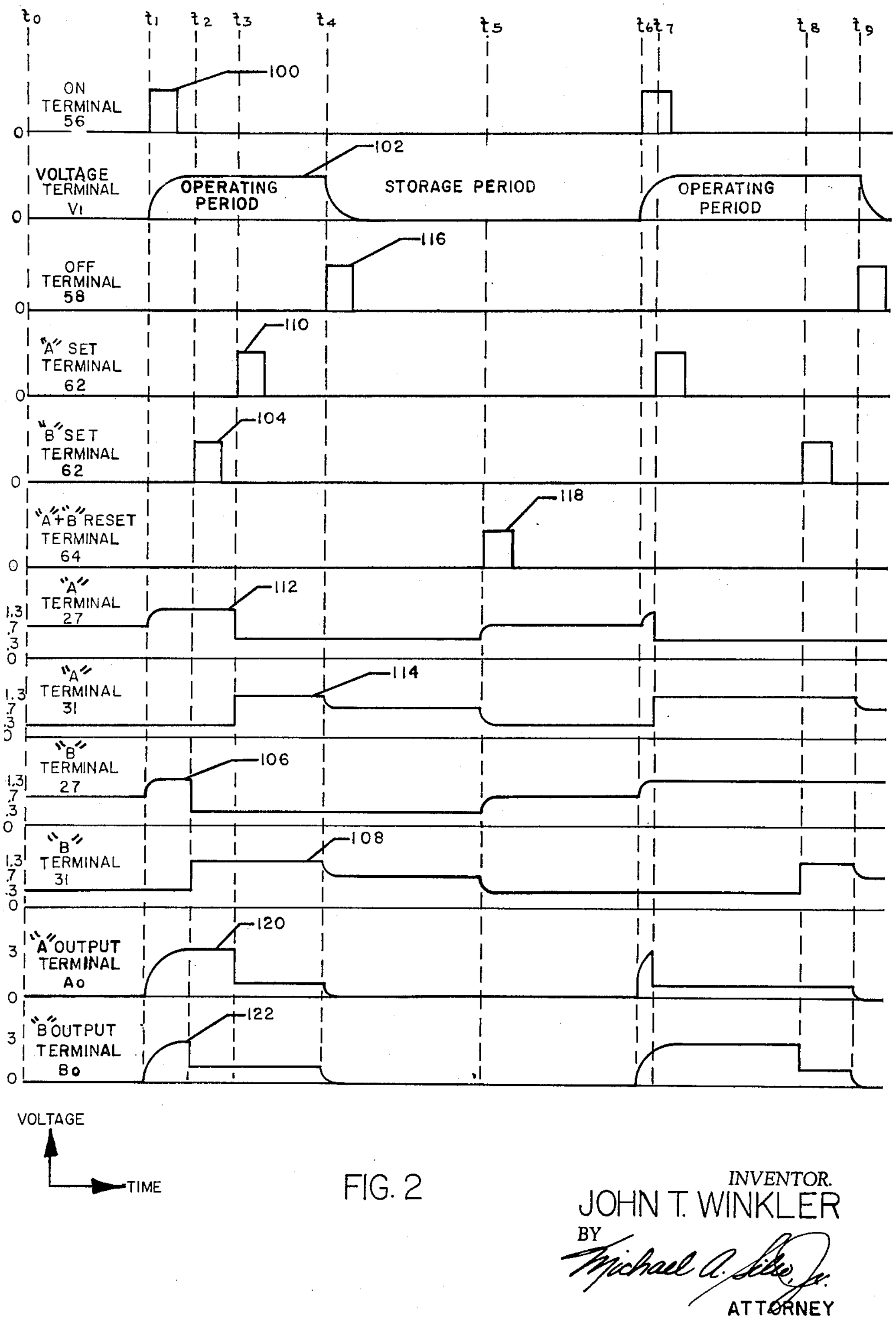
FIGURE 2 depicts a plurality of waveforms characteristically present at several terminals during normal operation of the storage circuit of FIG. 1.

*Mode of operation—FIGURES 1 and 2*

Referring to FIG. 2, wherein several voltage waveforms are shown for various terminals in the storage circuits A, B . . . N, time $t_0$ shows the voltage conditions of the various terminals prior to applying control signals to the ON-OFF terminals 56 and 58 or input signals to the SET-RESET terminals 62 and 64.

At time $t_1$ an ON control signal 100 is applied to ON terminal 56 which drives ON-OFF flip-flop 54 into one of its stable states wherein the output terminal 60 of flip-flop 54 rises to a positive voltage level. The voltage level at output terminal 60 will be sufficiently positive to drive voltage control 44 into operation which in turn couples a positive signal to base 46 to bias transistor $T_5$ into conduction. It should be noted that the feedback loop which includes conductor 43, voltage control 44, conductor 61 and transistor $T_5$, enables transistor $T_5$ to generate a regulated voltage $V_1$ in its collector circuit. After ON signal 100 is applied, the regulated voltage source $V_1$, as shown by waveform 102, is applied to the anode of diodes 36 and 38 thereby providing a low resistance path in the collector circuit of transistors $T_1$ and $T_2$.

At time $t_3$, the conductive states of transistors $T_1$ and SET terminal 62 of storage circuit B. It should be noted that in the exemplary embodiment of FIG. 1, transistor $T_1$ is normally non-conducting and transistor $T_2$ normally conducting. Thus, after SET signal 104 is applied to terminal 62 of storage circuit B, transistor $T_1$ is driven into a conducting state which in turn drives transistor $T_2$ into non-conduction. Thus, the voltage at junction terminal 27 of storage circuit B at time $t_2$ will be low whereas the voltage at junction terminal 31 will be high, for example, as shown by waveforms 106 and 108, respectively.

At time $t_3$, the conductive state of transistors $T_1$ and $T_2$ of storage circuit A changes in a like manner by virtue of the application of the SET signal 110 to SET terminal 64 of storage circuit B.

The waveforms 112 and 114 represent the voltage present at junction terminals 27 and 31, respectively, of storage circuit A. In this embodiment, transistor $T_1$ is normally non-conducting and transistor $T_2$ is normally conducting. Thus, after SET signals 110 is applied to terminal 62 of storage circuit A, transistor $T_1$ is driven into conduction which in turn drives transistor $T_2$ into non-conduction. Thus, the voltage at junction terminal 27 of storage circuit A at time $t_2$ will be low whereas the voltage at junction terminal 31 will be high, for example, as shown by waveforms 112 and 114, respectively.

At time $t_4$, OFF signal 116 is applied to OFF terminal 58 of ON-OFF flip-flop 54. This causes the voltage at terminal 60 to fall, as shown by waveform 102, and thereby driving Voltage Control 44 out of its operating condition and consequently causing transistor $T_5$ to return to its normally non-conducting state. Thus, the regulated voltage $V_1$ is disconnected from conductor 40 and the storage circuits A, B . . . N are driven into their low current mode. This is so by virtue of switch diodes 36 and 38 being reverse biased and consequently driven into a non-conducting state so that the collector current of transistors $T_1$ and $T_2$ of each storage circuit must now completely flow through the high resistors 30 and 34. It should be noted that the application of OFF signal 116 does not cause the transistors in each storage circuit to reverse their state of operation at the time the OFF pulse was applied. Thus, the storage circuits A, B . . . N retain their last operating state after OFF signal 116 is applied. This latter state may be referred to as the storage or sustaining period.

At time $t_5$, a RESET signal 118 is applied to reset terminals 64 of both storage circuits A and B. This causes the transistors $T_2$ of the storage circuits A and B to return to their normal conducting states which in turn correspondingly drives transistors $T_1$ of each storage circuit into their normally non-conducting states.

Times $t_6$ to $t_9$ respectively correspond to times $t_1$ to $t_4$ and the operating conditions of each storage circuit caused by the ON-OFF and SET-RESET signals is similar in all respects to the operating conditions of the storage circuits during times $t_1$ to $t_4$ as above described in detail.

The voltage waveforms 120 and 122 respectively represent the voltages present at output terminals $A_0$ and $B_0$ during times $t_1$ to $t_9$.

It will be apparent from the foregoing that the storage circuits A, B . . . N must be switched into a high current mode during high speed operating periods and that it is desirable from a power economy viewpoint that such storage circuits be switched into a low current mode during storage periods. In the present invention these necessary and ideal circuit conditions are uniquely accomplished by applying the positive pulse 100 to ON-OFF flip-flop terminal 56, which drives the storage circuits into a high current mode, and by applying the positive pulse 116 to ON-OFF flip-flop terminal 58 which returns the storage circuits to their low current mode. As mentioned in detail above, the ON pulse 100 advantageously couples the regulated voltage $V_1$ to diodes 36 and 38 which in turn provides a low resistance current path for the transistors $T_1$ and $T_2$ of the storage circuits A, B . . . N through resistors 28 and 32 and diodes 36 and 38, respectively. The OFF pulse 116 advantageously disconnects the regulated voltage $V_1$ from the diodes 36 and 38 which in turn provides a high resistance current path for the transistors $T_1$ and $T_2$ of storage circuits A, B . . . N through resistors 28 and 32 and 30 and 34, respectively. Thus, when source $V_1$ is coupled to diodes 36 and 38, the storage circuits are in their high current mode whereas removal of source $V_1$ from diodes 36 and 38 places the storage circuits in their low current mode.

Although RESET pulse 118, as shown in FIG. 2, is applied during the storage interval $t_4$ to $t_6$, it is to be understood that the storage circuits A, B, . . . N may also be reset during the operating intervals $t_1$ to $t_4$ or $t_6$ to $t_9$. This is so because the pulse 118 is of sufficient amplitude to drive the transistors $T_4$ which in turn drive the transistors $T_2$ whether the storage circuits are in a high or low current mode.

The components of storage circuits B . . . N, or any additional storage circuit required, are substantially the same as that previously discussed with regard to storage circuit A. Likewise, the operation of the additional storage circuits are substantially the same as storage circuit A. As shown in the accompanying drawing, each storage circuit A, B . . . N may be independent or dependent with respect to each other and any or all of such storage circuits may function during operating intervals when they are in their high current mode and will store information when they are in their low current mode. Readout from the storage circuits may be conventionally performed by parallel or series readout techniques during high current operation.

It will be apparent, however, that the dual current mode storage circuit of the present invention may be incorporated in many well known computer circuits such as decade counters, or shift registers. The specific design techniques for intercoupling the storage circuits of the present invention into special configurations does not constitute a part of this invention and such specific interconnections or inter-relationships do not depart from the spirit and scope of the present invention. By way of example, in a man portable range measurement counter which configuration indicates range by measuring the time between the transmitted pulse and echo, the flip-flops would be connected so as to accumulate pulses at a rapid rate. However, after the counter has accumulated the information, an OFF signal would be applied to the ON-OFF flip-flop 54 thereby closing the electronic switch 42 and consequently switching all the storage circuits of the counter into their low current modes. Therefore, during the storage intervals the counter would be in a low power consuming state and advantageously providing high economy in power consumption so that the design of the power source may be of minimum capacity so as to considerably reduce space and weight requirements.

Additionally, the unique dual current mode storage circuits of the present invention eliminates any need for secondary low current storage devices required by prior known high speed computer systems. It is to be therefore understood that the specific input and output circuits of each storage circuit A, B . . . N is merely exemplary and depending upon the use of these storage circuits many well known input and output techniques may be incorporated without departing from the spirit and scope of the present invention.

It will be apparent therefore that the utilization of the unique dual current mode high speed electronic storage circuit of the present invention advantageously provides relatively low power consumption during storage intervals and enables the storage circuit to operate in a high current mode during operating intervals, yet be rapidly switched to and maintained in a low current mode to sustain the circuit during storing intervals. Accordingly, the unique electronic storage circuit of the present invention provides relatively low power consumption thus decreasing battery storage capacity without requiring the use of data shifting techniques for storing the data in secondary low power storage circuits. Thus, it will be further apparent from the foregoing that the present invention provides an electronic storage circuit which is relatively economical, has minimum space and weight requirements, is simple in operation and highly reliable in providing the intended functions and achieving the desired objects.

For exemplary purposes only, the following parameters and performance data are included:

| | |
|---|---|
| $T_1$–$T_4$ | 2N709 or 2N2651. |
| $T_5$ | 2N2658. |
| $T_A$, $T_B$ . . . $T_N$ | 2N709 or 2N2651. |
| B+ | 5 to 7 volts. |
| $V_1$ | 3 volts. |
| $V_2$ | 5 to 7 volts. |
| $R_{30}$ and $R_{34}$ | 8 kilohms. |
| $R_{28}$ and $R_{32}$ | 400 ohms. |
| $R_{24}$ and $R_{26}$ | 150 ohms. |
| $R_{78}$ | 300 ohms. |
| $R_{84}$ | 600 ohms. |
| $D_{36}$ and $D_{38}$ | 1N3471. |

While merely a single embodiment of the present invention has been described in detail, and merely a few specific uses for this embodiment have been described in general, it is to be understood that other modifications and specific uses are clearly contemplated which would be apparent to persons skilled in the art without departing from the spirit of the invention or the scope of the appended claims.

I claim:

1. An electronic storage circuit having dual current mode characteristics for providing a low current mode during storage periods and a high current mode during operating periods, comprising:

(a) storage means for storing intelligence, said storage means having storage and operating periods;

(b) current flow resisting means connected to said storage means for placing said storage means in said low current mode; and (c) switching means for effectively disconnecting said current flow resisting means from said storage means during said storage periods, thereby placing said storage means in said high current mode.

2. An electronic storage circuit in accordance with claim 1, wherein:

(a) said storage means further includes a primary current path;

(b) said current flow resisting means includes resistors connected in series with said primary current path of said storage means; and (c) said switching means includes diodes connected in parallel with said resistors.

3. An electronic storage circuit having dual current mode characteristics for providing a low current mode during storage intervals and a high current mode during operating interval, including, in combination:

(a) storage means for storing intelligence, said storage means having a primary current path;

(b) current flow resisting means connected in series with said primary current path for placing said storage means in said low current mode;

(c) switching means connected in parallel to said resisting means for effectively disconnecting said resisting means from said storage means so as to place said storage means in said high current mode; and (d) means coupled to said switching means for controlling the operation of said switching means so that said storage means will be in said low current mode during said storage intervals and in said high current mode during said operating intervals.

4. An electronic storage circuit having dual current mode characteristics for providing a low current mode during storage intervals and a high current mode during operating intervals, including, in combination:

(a) storage means for storing intelligence, said storage means having a primary current path and storage and operating intervals;

(b) current flow resisting means connected in series with said primary current path for placing said storage means in said low current mode:

(c) switching means connected in parallel to said resisting means for effectively disconnecting said resisting means from said storage means so as to place said storage means in said high current mode; and (d) second switching means coupled to said first switching means for selectively causing said first switching means to effectively disconnect said resisting means from said storage means during said operating intervals, whereby said storage means will be in said high current mode during said operating intervals.

5. An electronic storage circuit having dual current mode characteristics for providing a low current mode during storage intervals and a high current mode during operating intervals, including, in combination:

(a) storage means for storing intelligence, said storage means having primary current and storage and operating intervals;

(b) current flow resisting means connected to said storage means for providing a high resistance path for said primary current so as to place said storage means in said low current mode;

(c) unidirectional current conducting means connected to said storage means for providing a low resistance path for said primary current so as to place said storage means in said high current mode; and (d) switching means connected to said unidirectional means for electrically disconnecting said unidirectional means from said storage means during said storage intervals and for electrically connecting said unidirectional means to said storage means during said operating intervals, whereby said storage means will be in said low current mode during said storage intervals and in said high current mode during said operating intervals.

6. An electronic storage circuit capable of selectivity operating in a low current mode during storage periods and a high current mode during operating periods, including, in combination:

(a) bistable storage means for storing digital information, said storage means having a primary current path and storage and operating periods;

(b) resistor means serially connected in said primary current path for providing a high resistance path for said primary current so as to cause said storage means to be normally in said low current mode;

(c) diode switching means removably connected in series with said primary current path and in parallel with said resistive means, said diode switching means being selectively capable of providing a low resistance path for said primary current so as to effectively remove said resistor means out of said primary current path and thereby cause said storage means to be in said high current mode; and (d) second switching means connected to said diode switching means for electrically connecting said diode switching means into said storage circuit during said operating periods so as to effectively remove said resistor means from said storage circuit and cause said storage means to be in its high current mode, and for electrically disconnecting said diode switching means from said storage circuit during said storage intervals so as to return said storage means to its normally low current mode.

7. An electronic storage circuit in accordance with claim 6 and further including, in combination:

(a) input means connected to said bistable storage means for inserting said digital information during said high current mode; and (b) output means connected to said bistable storage means for removing said digital information during said high current mode.

8. An electronic storage circuit capable of selectively operating in a low current mode during storage periods and a high current mode during operating periods, including, in combination:

(a) bistable storage means for storing digital information, said storage means having a primary current flow and storage and operating periods;

(b) a source of potential serially connected to said storage means through current limiting resistors for providing a high resistance path for said primary current;

(c) said current limiting resistors having relatively high resistance for causing said storage means to be normally in said low current mode;

(d) a second source of potential serially connected to said storage means through an electronic switch and a diode means for providing a low resistance current path from said storage means to said second source;

(e) said electronic switch and diode means having relatively low resistance for causing said storage means to be in said high current mode; and (f) said electronic switch being capable of electronically disconnecting said second source from said diode means during said storage periods for substantially preventing said primary current from flowing through said low resistance current path and substantially permitting said primary current to flow through said high resistance current path, thereby causing said storage means to be in said low current mode, and for electronically connecting said second source to said diode means during said operating periods for predominantly permitting said primary current to flow through said low resistance current path and predominantly preventing said primary current from flowing through said high resistance current path, thereby causing said storage means to be in said high current mode.

9. An electronic storage circuit in accordance with claim 8 and further including, in combination:
(a) control means connected to said electronic switch for selectively closing said electronic switch during said operating periods and selectively opening said electronic switch during said storage periods.

10. An electronic storage circuit in accordance with claim 9 and further including, in combination:
(a) input means connected to said storage means for inserting said digital information into said storage means during said operating periods;
(b) second input means connected to said control means for coupling control signals to said control means so as to predeterminedly cause said control means to open and close said electronic switch; and
(c) output means connected to said storage device for removing said digital information from said storage means.

11. An electronic storage circuit capable of selectively operating in a low current mode during storage periods and a high current mode during operating periods, including, in combination:
(a) a bistable storage device for storing digital information comprising two cross-coupled transistors, each having a base, collector and emitter and emitter-collector current flow;
(b) a D.C. source of potential for supplying current to said transistors;
(c) a pair of current limiting resistors each having one end connected to said D.C. source and the other end respectively connected to one of said collectors of said transistors for providing respective high resistance current paths for said emitter-collector current of each of said transistors;
(d) a second D.C. source for supplying current to said transistors;
(e) a pair of diodes, each having an anode and cathode with said cathodes being respectively connected to said collectors of said transistors and said anodes being connected in common;
(f) an electronic switch connected between said second D.C. source and said common connection of said anodes of said diodes for selectively providing respective low resistance current paths for said emitter-collector current of each of said transistors; and
(g) control means connected to said electronic switch for selectively closing said electronic switch during said operating periods and causing said emitter-collector current of said transistors to predominately flow through said low resistance current paths, thereby switching said storage circuit into said high current mode, and for selectively opening said electronic switch during said storage periods and causing said emitter-collector current of said transistors to predominately flow through said high resistance current paths, thereby switching said storage circuit into said low current mode.

12. An electronic storage circuit in accordance with claim 11, wherein:
(a) said electronic switch comprises a third transistor having a base, collector and emitter, with said collector connected to said second D.C. source and said emitter connected to said common connection of said diodes; and
(b) said control means comprises a bistable circuit having two inputs and one output with said output being coupled to said base of said third transistor, whereby said third transistor is biased into conduction when said bistable circuit is in one of its stable states and biased into non-conduction when said bistable circuit is in its other stable state.

13. An electronic storage circuit in accordance with claim 12, and further including, in combination:
(a) input means connected to said storage device for inserting said digital information into said storage means during said operating periods;
(b) second input means connected to said bistable circuit for coupling control signals to said bistable circuit so as to drive said bistable circuit into said one stable state during said operating periods and into said other stable state during said storage periods; and
(c) output means connected to said storage device for removing said digital information from said storage device.

14. An electronic storage circuit capable of selectively operating in a low current mode during storage periods and a high current mode during operating periods, including, in combination:
(a) flip-flop storage means for storing digital information comprising two cross-coupled transistors, each having a base, collector and grounded emiter;
(b) a source of potential for supplying current to said transistors, said source being connected to each of said collectors of said transistors through respective current limiting resistors for providing an emitter-collector current path from said transistors to said source;
(c) said current limiting resistors having relatively high resistance and being capable of holding said transistors in said low current mode;
(d) a second source of potential for supplying current to said transistors, said second source being connected to each of said collectors of said transistors through an electronic switch and respective diodes for providing a second emitter-collector current path from said transistors to said second source;
(e) said electronic switch and diodes having relatively low resistance and being capable of holding said transistors in said high current mode;
(f) said electronic switch being normally open so that said second source is normally disconnected from said diodes so that said diodes are in a normally nonconducting state, thereby blocking said emitter-collector current from flowing through said second current path and allowing substantially all emitter-collector current to flow through said first current path;
(g) control means for selectively closing said electronic switch during operating periods so as to connect said second source to said diodes and bias said diodes into a conducting state so as to cause said emitter-collector current to predominantly flow through said second current path and thereby switch said transistors into said high current mode, and for selectively opening said electronic switch during said storage periods so as to cause said emitter-collector current to predominately flow through said first current path and thereby switch said transistors into said low current mode.

15. An electronic storage circuit in accordance with claim 14 and further including, in combination:
(a) input means connected to said flip-flop storage means for inserting said digital information into said storage means during said operating periods; and
(b) output means connected to said flip-flop storage means for removing said digital information from said storage circuit.

References Cited by the Examiner

UNITED STATES PATENTS

| | | | |
|---|---|---|---|
| 3,028,507 | 4/1962 | Sacks | 307—88.5 |
| 3,069,561 | 12/1962 | Tabisz | 307—88.5 |
| 3,169,199 | 2/1965 | Putterman | 307—88.5 |

ARTHUR GAUSS, *Primary Examiner.*